US008862294B2

(12) United States Patent
Falkenstein et al.

(10) Patent No.: US 8,862,294 B2
(45) Date of Patent: Oct. 14, 2014

(54) METHOD FOR OPERATING A VEHICLE HAVING A HYBRID DRIVE SYSTEM AS WELL AS A DRIVE SYSTEM AND A VEHICLE

(75) Inventors: Jens-Werner Falkenstein, Aalen (DE); Manfred Hellmann, Hardthof (DE); Mario Kustosch, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 13/119,351

(22) PCT Filed: Sep. 10, 2009

(86) PCT No.: PCT/EP2009/061737
§ 371 (c)(1),
(2), (4) Date: Jun. 6, 2011

(87) PCT Pub. No.: WO2010/037619
PCT Pub. Date: Apr. 8, 2010

(65) Prior Publication Data
US 2011/0224856 A1    Sep. 15, 2011

(30) Foreign Application Priority Data

Oct. 1, 2008  (DE) .......................... 10 2008 042 544

(51) Int. Cl.
*B60W 20/00* (2006.01)
*B60W 10/06* (2006.01)
*B60W 10/08* (2006.01)
*B60W 30/188* (2012.01)
*B60W 30/184* (2012.01)
*B60K 6/20* (2007.10)
*B60W 50/08* (2012.01)

(52) U.S. Cl.
CPC ........ *B60W 10/06* (2013.01); *B60K 6/20* (2013.01); *Y02T 10/56* (2013.01); *B60W 30/1882* (2013.01); *B60W 2510/246* (2013.01); *B60W 2510/244* (2013.01); *B60W 50/082* (2013.01); *B60W 2540/103* (2013.01); *B60W 20/00* (2013.01); *B60W 30/184* (2013.01); *B60W 2710/0666* (2013.01); *Y02T 10/52* (2013.01); *Y02T 10/54* (2013.01); *Y02T 10/6286* (2013.01); *B60W 30/1884* (2013.01); *B60W 2520/10* (2013.01); *B60W 2540/106* (2013.01); *B60W 10/08* (2013.01)
USPC ................................................ 701/22

(58) Field of Classification Search
USPC ....................................................... 701/22
See application file for complete search history.

(56) References Cited

U.S. PATENT DOCUMENTS 4,627,522 A * 12/1986 Ulrich et al. ............... 192/35
5,119,688 A *  6/1992 Snyder, Jr. .................. 74/482
(Continued)

FOREIGN PATENT DOCUMENTS

DE      196 48 055      6/1998
DE   10 2004 049324    4/2006
(Continued)

OTHER PUBLICATIONS
JPO machine translation of JP 2001-152903 (original JP document published Jun. 5, 2001).*

*Primary Examiner* — Behrang Badii
*Assistant Examiner* — David Testardi
(74) *Attorney, Agent, or Firm* — Kenyon & Kenyon LLP

(57) ABSTRACT

A method is described for operating a hybrid drive system which has a first drive unit, in particular an internal combustion engine, and a second drive unit, in particular an electric motor, which includes activating the first drive unit and the second drive unit in such a way that the first drive unit and the second drive unit each provide an output variable for the purpose of providing a total output variable; limiting the output variable provided by the first drive unit to a limiting value which is less than a maximum output variable which may be provided by the first drive unit; canceling the limitation if the output variable provided by the second drive unit corresponds to a maximum output variable which may be provided by the second drive unit.

6 Claims, 2 Drawing Sheets

(56) References Cited

U.S. PATENT DOCUMENTS

| | | | |
|---|---|---|---|
| 6,054,844 A * | 4/2000 | Frank | 322/16 |
| 6,570,265 B1 * | 5/2003 | Shiraishi et al. | 290/40 C |
| 6,823,840 B1 * | 11/2004 | Tamai et al. | 123/352 |
| 6,832,148 B1 * | 12/2004 | Bennett et al. | 701/54 |
| 7,469,672 B2 * | 12/2008 | Andri | 123/198 F |
| 7,792,628 B2 * | 9/2010 | Aswani et al. | 701/103 |
| 8,250,864 B2 * | 8/2012 | Pott et al. | 60/601 |
| 2002/0078682 A1 * | 6/2002 | Igarashi et al. | 60/280 |
| 2005/0080523 A1 * | 4/2005 | Bennett et al. | 701/22 |
| 2005/0256631 A1 * | 11/2005 | Cawthorne et al. | 701/99 |
| 2007/0266711 A1 * | 11/2007 | Falkenstein et al. | 60/702 |
| 2007/0278021 A1 * | 12/2007 | Pott et al. | 180/65.2 |
| 2008/0305921 A1 * | 12/2008 | Falkestein | 477/3 |

FOREIGN PATENT DOCUMENTS

| | | | | |
|---|---|---|---|---|
| DE | 10 2006 007983 | | 8/2007 | |
| DE | 10 2006 013676 | | 9/2007 | |
| DE | 10 2007 002734 | | 7/2008 | |
| FR | 2784626 | * | 4/2000 | B60K 6/04 |
| JP | 08088905 A | * | 4/1996 | B60L 11/14 |
| JP | 2001152903 A | * | 6/2001 | F02D 29/06 |

* cited by examiner

METHOD FOR OPERATING A VEHICLE HAVING A HYBRID DRIVE SYSTEM AS WELL AS A DRIVE SYSTEM AND A VEHICLE

FIELD OF THE INVENTION

The present invention relates to drive systems for vehicles having an internal combustion engine and a further alternative drive, the efficiency and environmental friendliness of the internal combustion engine being optimized in particular.

BACKGROUND INFORMATION

In vehicles which have both an internal combustion engine and a further alternative drive, for example an electric drive in the form of electric motors, such vehicles being, for example, vehicles having hybrid drive systems, the driver's propulsion request, which is usually issued by an accelerator pedal and which may be generally referred to as the driver-requested torque FWM, may usually be provided by one of the drives or also by both drives combined. In the latter case, both the internal combustion engine and the alternative drive each provide a partial torque for driving the vehicle, it being possible to set the distribution of partial torques as a function of vehicle states, for example as a function of the charge capacity of the power source which supplies the alternative drive. If the driver requests a higher driving torque than the internal combustion engine is able to provide alone, the alternative drive is additionally connected for a certain period of time in all situations to achieve the driver-requested torque.

Operating the internal combustion engine close to the maximum driving torque or at the maximum possible driving torque (full load) may have a negative impact on consumption, exhaust gas quality, and wear on the engine and drivetrain components. For example, in gasoline engines, in particular in supercharged engines, enrichment must take place at close to full load (lambda<1) to prevent a thermal overload. The enrichment may also be used to boost performance. However, this measure increases consumption and the emission of CO and HC concentrations in the exhaust gas.

In diesel engines, soot emissions increase significantly at full load or close to full load.

SUMMARY OF THE INVENTION

An object of the exemplary embodiments and/or exemplary methods of the present invention is to provide a drive system for a vehicle as well as a method for operating a drive system for a vehicle, the drive system being operated in such a way that negative effects on consumption, exhaust gas quality, and wear on the engine and drivetrain components are largely avoided.

This object is achieved by the method for operating a drive system for a vehicle according to the description herein as well as by the drive system and the vehicle according to the further descriptions herein.

Further advantageous embodiments of the present invention are specified in the further descriptions herein.

According to a first aspect, a method is provided for operating a hybrid drive system which has a first drive unit, in particular an internal combustion engine, and a second drive unit, in particular an electric motor. The method includes the following steps:

activating the first drive unit and the second drive unit in such a way that the first drive unit and the second drive unit each provide an output variable for the purpose of providing a total output variable;

limiting the output variable provided by the first drive unit to a limiting value which is less than a maximum output variable which may be provided by the first drive unit;

canceling the limitation if the output variable provided by the second drive unit corresponds to a maximum output variable which may be provided by the second unit.

The limiting value may be optimized with regard to an operating aspect of the first drive unit. The operating aspect regarding which the limiting torque is optimized may correspond to an efficiency and/or an exhaust gas emission rate and/or a rate of wear on the internal combustion engine and/or on a drivetrain component.

The limitation may be canceled as a function of one or more operating states of the drive system and/or of an external condition.

One idea of the method described above is to limit the output variable provided by the drive unit, for example a partial torque, to a limiting value, for example a limiting driving torque at which the operation of the first drive unit with regard to an operating aspect, for example with regard to the exhaust gas quality and/or with regard to the efficiency and/or with regard to the wear on the engine and drivetrain components is improved over the efficiency, the exhaust gas quality, or the wear close to or at a maximum output variable of the first drive unit, for example a maximum driving torque. This limiting value, for example the limiting driving torque, is predefined in a suitable manner and limits the output variable provided by the first drive unit. In particular, an operating reserve resulting from the maximum output variable of the first drive unit and the limiting value may be released as a function of operating states of the drive system, as a function of vehicle states of a vehicle equipped with the drive system or as a function of external conditions and provided or not provided for driving the vehicle. If a higher total output variable is requested in the absence of the applicable vehicle states and external conditions, the additional output variable needed for this higher total output variable is provided, if available, by the alternative drive.

The maximum output variable which may be provided by the second drive unit may furthermore depend on an operating state of the drive system, in particular a state of charge of an electrical power source.

According to a further specific embodiment, the first drive unit and the second drive unit may be activated according to a preset engine management strategy in such a way that the engine management strategy provides an indication of a relationship of the output variables to each other, the engine management strategy taking into account a state of charge of an electrical power source.

The operating state for canceling the limitation may furthermore be present if a kickdown is detected in which an accelerator pedal of a vehicle equipped with the drive system is fully deflected at least at a predetermined rate of change.

As an alternative or in addition, the operating state for canceling the limitation may be present if a rotational speed of the first drive unit below a rotational speed threshold value and a load on the drive system which is higher than a load threshold value are detected.

The time period for canceling the limitation may furthermore be set to a maximum time period. In particular, the maximum time period may be set as a function of the one or more operating states.

In particular, the output variable of the drive units may equal a driving torque, a propulsion power or a variable dependent thereon.

According to a further aspect, a device is provided for operating a hybrid drive system which has a first drive unit, in particular an internal combustion engine, and a second drive unit, in particular an electric motor. The device includes:

an engine management unit which is designed to activate the first drive unit and the second drive unit in such a way that the first drive unit and the second drive unit each provide an output variable for the purpose of providing a total output variable;

a limiting unit for limiting the output variable provided by the first drive unit to a limiting value which is less than a maximum output variable which may be provided by the first drive unit;

a control unit which is coupled to the limiting unit for the purpose of canceling the limitation as a function of one or more operating states of the drive system and/or an external condition if the output variable provided by the second drive unit corresponds to a maximum output variable which may be provided by the second drive unit.

According to a further aspect, a drive system is provided which has a first drive unit, a second drive unit, and the above device.

According to a further aspect, a vehicle having the above drive system is provided.

Specific embodiments of the present invention are explained in greater detail below on the basis of the attached drawings.

DETAILED DESCRIPTION

The specific embodiments described below relate to drive systems for vehicles, in particular drive systems having a first drive unit whose efficiency and/or whose emissions and/or whose wear behavior at a maximum load torque or close to the maximum load torque is not optimal for the operation thereof. This is the case, for example, in internal combustion engines.

In particular, the specific embodiments discussed below relate to drive systems for hybrid vehicles, i.e., drive systems which have a further, alternative second drive unit in addition to the internal combustion engine. The second drive unit may be designed, in particular, in the form of an electric engine which is driven by an electrical power source.

Figure 1:
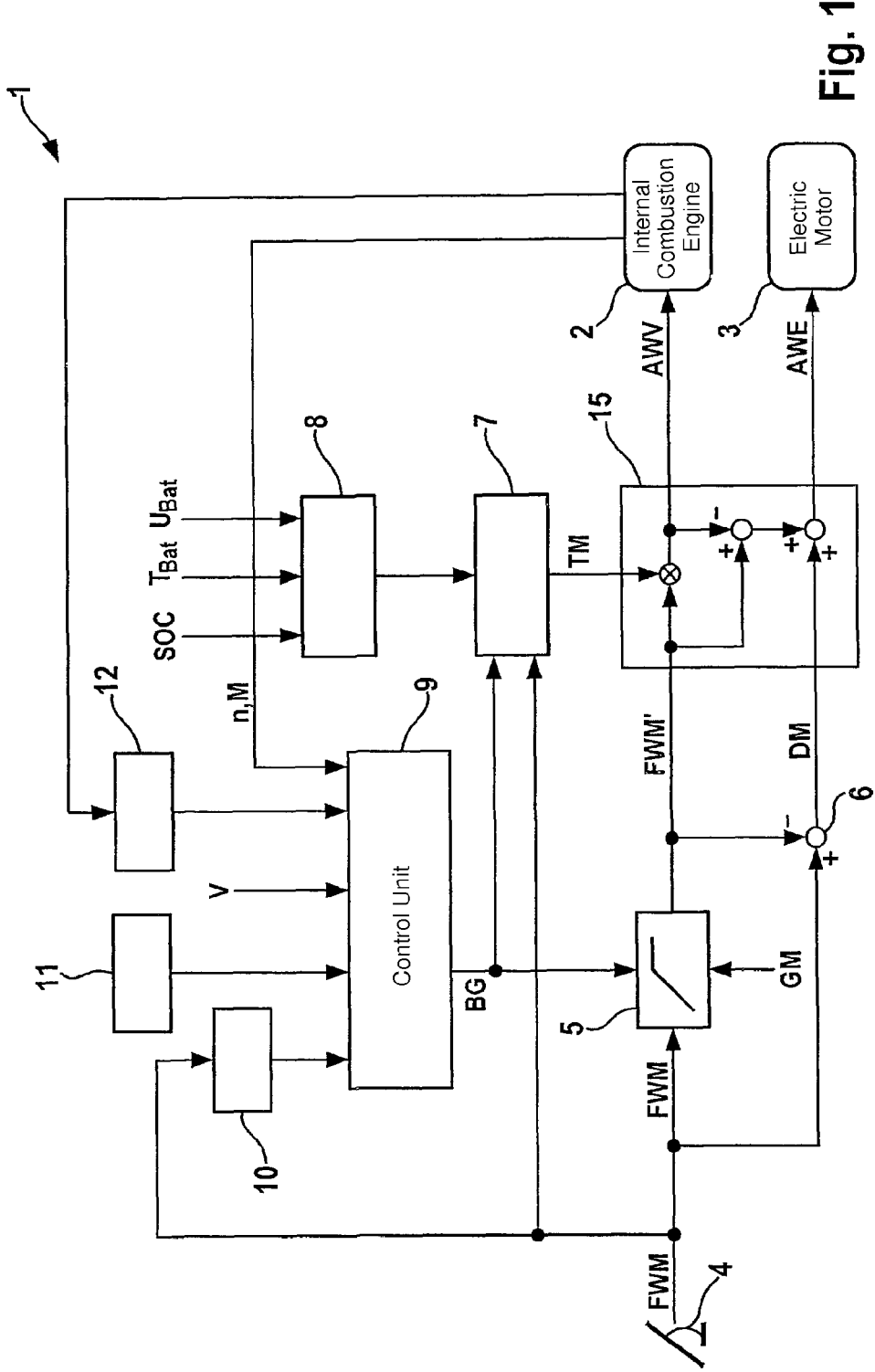
FIG. 1 shows a schematic block diagram of the drive system for operating a vehicle.

FIG. 1 shows a drive system 1, which has an internal combustion engine 2 as the first drive unit and an electric motor 3 as the second drive unit. During operation, drive units 2, 3 provide, for example, driving torques, i.e., partial torques, as output variables, a vehicle (not illustrated) being driven with the aid of a total driving torque which essentially results from the sum of the partial torques. A driver of the vehicle driven by drive system 1 may specify a driver-requested torque FWM via a setting device such as an accelerator pedal 4, this driver-requested torque being used to specify a total setpoint driving torque to be provided to the vehicle by drive system 1.

Driver-requested torque FWM is supplied to a limiting unit 5 which limits driver-requested torque FWM to a limiting driving torque GM which is preset by limiting unit 5. Limiting driving torque GM determines a maximum partial torque of the internal combustion engine which internal combustion engine 2 is to provide during normal operation. Limiting driving torque GM corresponds to a driving torque at which one or more of the following parameters is optimized with regard to the operation of internal combustion engine 2: efficiency (propulsion power with regard to consumption), exhaust gas emissions, wear on engine components, and the like. If the efficiency is taken into account when determining limiting driving torque GM, limiting driving torque GM may be set, for example, to a driving torque of 80% to 90% of the maximum driving torque of internal combustion engine 2, since a maximum efficiency of an internal combustion engine is usually achieved at these levels. Limiting unit 5 furthermore has an input for receiving a limiting signal BG which is provided to activate or deactivate the limitation of driver-requested torque FWM.

Driver-requested torque FWM and limited or not-limited driver-requested torque FWM' (depending on the limiting signal) output at the output of limiting unit 5 are supplied to a difference element 6 for the purpose of ascertaining the difference between driver-requested torque FWM and limited or not-limited driver-requested torque FWM'. Upon activating limiting unit 5, difference torque DM provides a difference torque DM which indicates the difference between driver-requested torque FWM and limiting driving torque GM in the event that driver-requested torque FWM exceeds limiting driving torque GM. If limiting unit 5 is not activated, difference torque DM is equal to 0.

To operate drive system 1, an engine management unit 7 is provided which provides an indication of partial torques which are to be provided by the particular drive unit, i.e., by internal combustion engine 2 and electric motor 3, depending on the instantaneous drive strategy. Engine management unit 7 thus determines internal combustion engine partial torque VTM and electric motor partial torque ETM as a function of driver-requested torque FWM, so that the total requested driving torque for driving the vehicle is delivered in sum. For this purpose, engine management unit 7 may use indications of drive system states or vehicle states, such as the state of charge of the electrical power source, e.g., a battery, which supplies the electric motor with electrical power. The state of charge of the electrical power source indicates the maximum load which may be placed on the battery and the maximum amount of work which may be requested. The battery condition is provided by a battery management unit 8. Battery management unit 8 determines the battery status as a function of its state of charge SOC and it temperature $T_{Bat}$ as well as additional variables such as battery voltage $U_{Bat}$ and the like.

Partial torques TM may be indicated, for example with the aid of a partial torque proportion factor TM with regard to driver-requested torque FWM or limited driver-requested torque FWM', as shown in FIG. 1. Proportion factor TM is supplied to a drive unit 15. Drive unit 15 provides an internal combustion engine activation variable AWV and an electric engine activation variable AWE to internal combustion engine 2 or electric motor 3 for the purpose of providing the internal combustion engine partial torque or the electric motor partial torque. A possible calculation formula may be:

$$AWV = FWM' * TM$$

$$AWE = FWM * (1-TM) + DM$$

Alternatively, engine management unit 7 may also specify the individual partial torques in the form of absolute values.

A control unit 9 is furthermore provided which generates a limiting signal BG which is applied to the input of limiting unit 5 for activating or deactivating the limitation. Control unit 9 analyzes the status of the vehicle or drive system and determines whether the drive system is to be operated in normal mode, i.e., in a mode in which the maximum partial torque to be provided by internal combustion engine 2 is always reduced to limiting driving torque GM, or if the drive system is to be operated in a further operating state in which the limitation of the partial torque of the internal combustion engine is canceled. Control unit 9 sets the limitation or the cancellation of the limitation by limiting unit 5 as a function of one or more of the following vehicle operating states.

1. The driver rapidly presses the accelerator pedal all the way and thereby performs a so-called kickdown. In this case, it is assumed that the driver would like to access the maximum possible driving torque of drive system 1 and thus requires both the maximum possible driving torque of internal combustion engine 2 and the maximum possible driving torque of electric motor 3. In this case, therefore, limiting unit 5 is deactivated so that driver-requested torque FWM is not limited.

The kickdown is detected when the accelerator pedal has reached a stop position and the variation over time of the accelerator pedal position until it reaches the stop position has at least one presettable gradient. A kickdown is detected, for example, when a driver fully depresses the accelerator pedal from an accelerator pedal position corresponding to half the maximum deflection of the accelerator pedal. The kickdown is detected with the aid of a kickdown detection unit 10, to which driver-requested torque FWM is supplied. Kickdown detection unit 10 thus carries out the queries as to whether the maximum deflection of the accelerator pedal has been reached and whether the gradient of the change in accelerator pedal deflection exceeds the determined threshold value.

2. A manually operated input unit 11 may furthermore be provided, e.g., in the form of a manually operated switch in the vehicle cockpit, whose switch position indicates whether or not the driving torque requested by internal combustion engine 2 should be limited.

3. It may be further provided to permit or not to permit the cancellation of the driving torque range above limiting driving torque GM for internal combustion engine 2 as a function of vehicle velocity v. For example, it may be unnecessary to set a high additional driving torque, e.g., for a passing maneuver at a high vehicle velocity (vehicle velocity greater than a proposed threshold velocity), since passing maneuvers at high velocities v are not relevant for safety. At lower velocities v, on the other hand, high accelerations may be relevant for safety, e.g., for leaving an intersection or for driving around a stationary obstacle in oncoming traffic.

4. A timer unit 12 may furthermore be provided which ensures that the duration of the negative effect of a deactivation of the limitation, e.g., due to the aforementioned vehicle states such as poor efficiency, elevated exhaust gas emissions, or elevated wear, is minimized. This is achieved by imposing a time limit on the deactivation of the limitation in limiting unit 5. For this purpose, timer unit 12 provides control unit 9 with a time signal, so that control unit 9 is able to determine whether the deactivation of the limitation is to be ended as a function of the vehicle situation or the status of the drive system. However, control unit 9 should perform a check as to whether the time limit for deactivating the limitation by limiting unit 5 does not result in a hindering of an acceleration process e.g., during a kickdown, so that the time period during which the limitation is canceled is prolonged if a kickdown is detected.

5. Control unit 9 may be furthermore connected to internal combustion engine 2 to receive details about rotational speed n of the drive shaft of the drive system and its load torque M, making it possible to determine whether a particular vehicle situation has occurred, for example driving uphill while towing a trailer. A situation of this type may be detected by a substantially elevated load torque outside the usual load torque range in that the high load torque occurs in a vehicle state in which the vehicle performs only a very slight acceleration or no acceleration at all. In this case, it may also be provided to deactivate, i.e., release, the limitation by limiting unit 5 upon detecting a rotational speed of the internal combustion engine below a rotational speed threshold value and a load on the drive system which is greater than a load threshold value. This may provide the driver with additional flexibility in increasing or maintaining the vehicle velocity.

Figure 2:
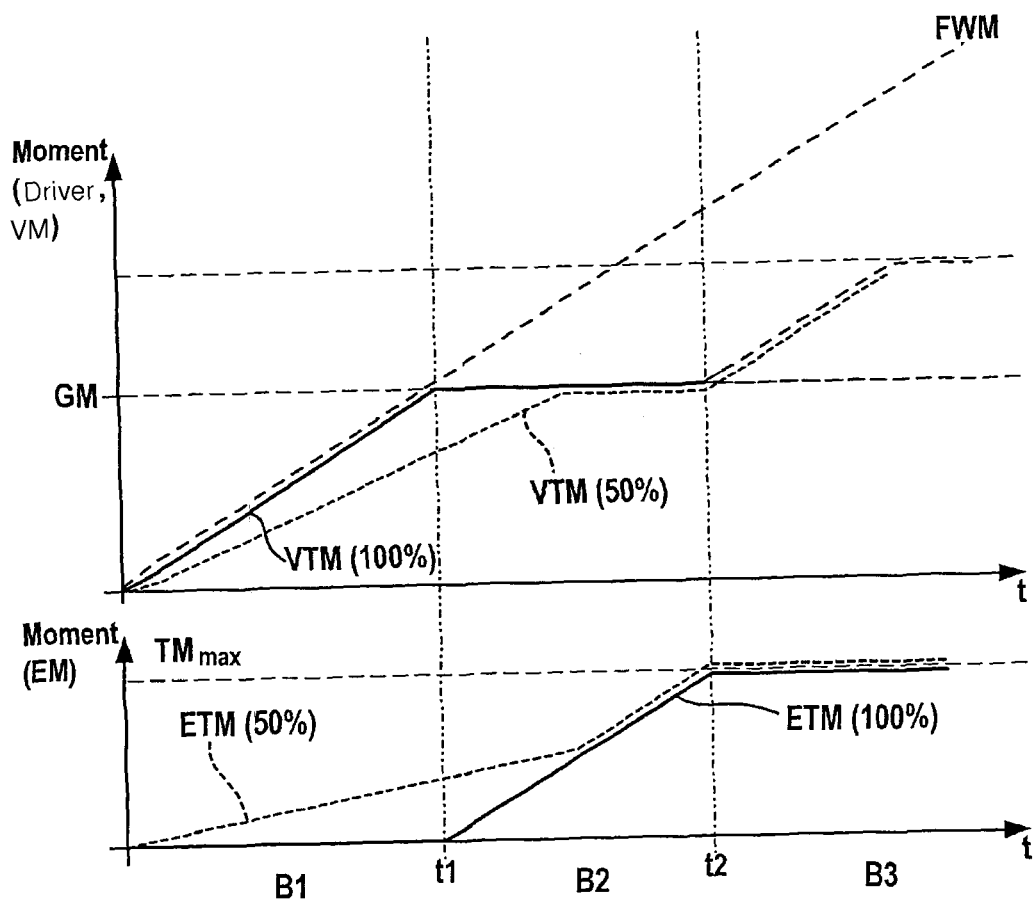
FIG. 2 shows a torque-time diagram of partial torques provided by an internal combustion engine and an electric motor at a continuously rising driver-requested torque.

FIG. 2 shows how engine management unit 7 combines the total driving torque from internal combustion engine partial torque VTM and electric motor partial torque ETM. FIG. 2 shows an operation of the vehicle in which the driver provides a continuously increasing driver-requested torque and engine management unit 7 specifies a partial torque percentage factor of TM=100% (partial torques are illustrated as solid lines), which may be the case, for example, if the battery has a low state of charge. It is apparent that the driving torque provided by internal combustion engine 2 largely corresponds to driver-requested torque FWM in a first range B1 at lower driver-requested torques FWM. Electric motor 3 does not contribute to the total driving torque in range B1.

Upon reaching limiting driving torque GM, the driving torque requested by internal combustion engine 2 is not further increased (see range B2) despite a further increase in driver-requested torque FWM. Instead, a further partial torque is made available, which is requested by electric motor 3. Depending on the status of the electrical power source for electric motor 3, electric motor partial torque ETM may be increased only up to a maximum partial driving torque $TM_{max}$.

Once maximum partial driving torque $TM_{max}$ has been reached, a further increase in the total driving torque may be achieved only if internal combustion engine partial torque VTM exceeds limiting driving torque GM according to driver-requested torque FWM, which has continued to increase over time. However, whether the total driving torque is further increased in range B3 according to further increasing driver-requested torque FWM depends on the states of the vehicle or the drive system, which is determined in control unit 9. If it is determined that the limitation is to be canceled, the driving torque additionally requested by internal combustion engine 2 beyond limiting driving torque GM is released, and internal combustion engine 2 is activated accordingly.

Limiting signal BG provided by control unit 9 thus depends to a considerable extent on driver-requested torque FWM, insofar as the driving torque provided by internal combustion engine 2 is always limited to limiting driving torque GM during normal operation, i.e., in a lower range of driver-requested torque FWM; only if internal combustion engine 2 provides a driving torque in the amount of limiting driving torque GM, and electric motor 3 is unable to provide a driving torque which is higher than maximum driving torque $TM_{max}$, e.g., due to the state of charge of the electrical power source, it is determined whether internal combustion engine 2 is to additionally provide a further proportion of the driving torque beyond limiting driving torque GM and whether the operating state which is optimized with regard to at least one aspect is to be left.

The curves of partial torques VTM, ETM at a partial torque proportion factor TM of 50% are illustrated by the broken lines. In contrast to the curves of partial torques VTM, ETM illustrated in FIG. 2, the contribution of electric motor 3 may be provided in range B1.

It may be furthermore provided that the proportion of electric motor partial torque ETM provided by electric motor 3 is greater for a cold internal combustion engine 2 (below a determined temperature threshold) than for a warm engine. In other words, to provide driver-requested torque FWM in ranges B1 and B2, engine management unit 7 may produce any combination of an internal combustion engine partial torque VTM in a range from 0 to limiting driving torque GM and an electric motor partial torque ETM from 0 to a maximum driving torque which may be provided as a function of the state of the electrical power source. Above the resulting total maximum driving torque, a further proportion of the driving torque may be provided by internal combustion engine 2, which results in the fact that a driving torque which is greater than limiting driving torque GM is provided as internal combustion engine partial driving torque VTM. However, operation in this range B3 is permitted only if predefined vehicle states are present, e.g., the engine states or vehicle states defined above.

To ensure that no change in velocity occurs during vehicle operation, for example when traveling at a constant velocity, it is possible, at a driver-requested torque FWM in range B2 and at a decreasing battery capacity and thus a decreasing electric motor partial torque, to provide that the limitation is canceled and the additional driving torque needed is provided by internal combustion engine 2 if driver-requested torque FWM may no longer be provided by limiting driving torque GM of internal combustion engine 2 and maximum driving torque $TM_{max}$ of electric motor 3 may be provided, whereby internal combustion engine 2 is operated outside, i.e., above the optimized operating point defined by limiting driving torque GM.

In principle, multiple limiting driving torques may also be provided as a function of different parameters regarding which the operation of the internal combustion engine is optimized. At multiple limiting driving torques, a kickdown, for example, may fully cancel the limitation, while a charge request of battery management unit 8 does not cause the limitation of the driving torque of the internal combustion engine to be fully canceled, but only produces a limitation to a further higher limiting driving torque which lies below the maximum driving torque of internal combustion engine 2.

The method described above is based on considering the driving torques provided by drive units 2, 3. However, it may also be based on provided propulsion power or on variables dependent on the driving torques or the propulsion power.

What is claimed is:

1. A method for operating a hybrid drive system, which has a first drive unit, which is an internal combustion engine, and a second drive unit, which is an electric motor, the method comprising:
    activating the first drive unit and the second drive unit so that the first drive unit and the second drive unit each provide an output variable for providing a total output variable;
    limiting the output variable provided by the first drive unit to a preset limiting value which is less than a maximum output variable provided by the first drive unit; and
    canceling the limiting of the output variable provided by the first drive unit when the output variable provided by the second drive unit corresponds to a maximum output variable provided by the second drive unit and a kickdown is detected in which an accelerator pedal of a vehicle equipped with the drive system is fully deflected at least at a predetermined rate of change.

2. A method for operating a hybrid drive system, which has a first drive unit, which is an internal combustion engine, and a second drive unit, which is an electric motor, the method comprising:
    activating the first drive unit and the second drive unit so that the first drive unit and the second drive unit each provide an output variable for providing a total output variable;
    limiting the output variable provided by the first drive unit to a preset limiting value which is less than a maximum output variable provided by the first drive unit;
    using the second drive unit to provide at least a portion of the total output variable while the output variable provided by the first drive unit is less than the limiting value;
    canceling the limiting of the output variable provided by the first drive unit under conditions of unusually high load torque in which a vehicle performs only a slight acceleration or no acceleration at all when a rotational speed of the first drive unit below a rotational speed threshold value and a load on the drive system which is higher than a load threshold are detected.

3. A method for operating a hybrid drive system, which has a first drive unit, which is an internal combustion engine, and a second drive unit, which is an electric motor, the method comprising:
    activating the first drive unit and the second drive unit so that the first drive unit and the second drive unit each provide an output variable for providing a total output variable;
    limiting the output variable provided by the first drive unit to a preset limiting value which is less than a maximum output variable provided by the first drive unit;
    wherein the limiting value is optimized with regard to an operating aspect of the first drive unit, and wherein the operating aspect includes at least one of: (i) at least one of an efficiency and an exhaust gas emission rate, (ii) and a rate of wear on the drive system;
    using the second drive unit to provide at least a portion of the total output variable while the output variable provided by the first drive unit is less than the limiting value;
    canceling the limiting of the output variable provided by the first drive unit for no longer than a maximum time period as imposed by a time signal from a timer unit of the hybrid drive system when the output variable provided by the second drive unit corresponds to a maximum output variable provided by the second drive unit while maintaining the output variable provided by the second drive unit.

4. The method of claim 3, wherein the maximum time period is set as a function of the one or more operating states.

5. The method of claim 3, wherein said control unit extends the maximum time period as needed to avoid hindering an acceleration process.

6. A method for operating a hybrid drive system, which has a first drive unit, which is an internal combustion engine, and a second drive unit, which is an electric motor, the method comprising:
    activating the first drive unit and the second drive unit so that the first drive unit and the second drive unit each provide an output variable for providing a total output variable as a function of a driver requested total output indicated by an accelerator pedal operated by the driver;

limiting the output variable provided by the first drive unit to a preset limiting value which is less than a maximum output variable provided by the first drive unit;

using the second drive unit to provide at least a portion of the total output variable while the output variable provided by the first drive unit is less than the limiting value;

canceling the limiting of the of the output variable provided by the first drive unit when the output variable provided by the second drive unit corresponds to a maximum output variable provided by the second drive unit while maintaining the output variable provided by the second drive unit; and selectively canceling the limiting of the output variable provided by the first drive unit in response to operation of a manually operated switch in a vehicle cockpit, the operation of which is independent of the operation of the accelerator pedal and whose switch position indicates whether or not the output variable of the first drive unit should be limited.

* * * * *